United States Patent
Kaneiwa

(10) Patent No.: US 7,800,486 B2
(45) Date of Patent: Sep. 21, 2010

(54) DRIVING OPERATION FEEDBACK APPARATUS AND PROGRAM FOR SAME

(75) Inventor: Toshiyuki Kaneiwa, Konan (JP)

(73) Assignee: DENSO CORPORATION, Kariya (JP)

( * ) Notice: Subject to any disclaimer, the term of this patent is extended or adjusted under 35 U.S.C. 154(b) by 272 days.

(21) Appl. No.: 11/907,839

(22) Filed: Oct. 18, 2007

(65) Prior Publication Data
US 2008/0278301 A1 Nov. 13, 2008

(30) Foreign Application Priority Data
Oct. 24, 2006 (JP) .............................. 2006-288725

(51) Int. Cl.
*B60Q 1/00* (2006.01)
(52) U.S. Cl. .............. 340/439; 340/426.11; 340/426.12
(58) Field of Classification Search .............. 340/425.5, 340/438–439, 901–905
See application file for complete search history.

(56) References Cited

U.S. PATENT DOCUMENTS

| 5,798,695 | A * | 8/1998 | Metalis et al. .............. 340/576 |
| 6,057,754 | A * | 5/2000 | Kinoshita et al. .......... 340/435 |
| 6,411,901 | B1 * | 6/2002 | Hiwatashi et al. .......... 701/301 |
| 6,487,500 | B2 * | 11/2002 | Lemelson et al. .......... 701/301 |
| 6,906,623 | B2 * | 6/2005 | Bauer et al. ................. 340/439 |
| 6,906,639 | B2 * | 6/2005 | Lemelson et al. .......... 340/903 |
| 6,931,309 | B2 * | 8/2005 | Phelan et al. .................. 701/1 |
| 2001/0029416 | A1 * | 10/2001 | Breed et al. .................... 701/45 |
| 2005/0023899 | A1 * | 2/2005 | Kitazawa ................... 307/10.1 |

FOREIGN PATENT DOCUMENTS

| JP | U-64-37755 | 3/1989 |
| JP | A-2001-171388 | 6/2001 |
| JP | A-2002-163789 | 6/2002 |
| JP | A-2002-225586 | 8/2002 |
| JP | A-2002-230696 | 8/2002 |
| JP | A-2006-185137 | 7/2006 |
| JP | A-2006-195638 | 7/2006 |

* cited by examiner

*Primary Examiner*—Brian A Zimmerman
*Assistant Examiner*—James Yang
(74) *Attorney, Agent, or Firm*—Posz Law Group, PLC

(57) ABSTRACT

A safe driving support apparatus in a vehicle is used in a manner that prevents an over-reliance of a driver on a safety device by an application of a technique. That is, for example, an evaluation of driving operation is lowered when the vehicle has been under control of an avoidance control for avoiding an unsafe situation of the vehicle, and the lowered evaluation of driving operation is recorded on a memory medium as well as being notified for the driver after evaluation is being changed. A provision of the avoidance control may result in a suppression of a vehicular function that contributes to a comfort in the vehicle among functions provided by in-vehicle devices.

2 Claims, 5 Drawing Sheets

DRIVING OPERATION FEEDBACK APPARATUS AND PROGRAM FOR SAME

CROSS REFERENCE TO RELATED APPLICATION

This application is based on and claims the benefit of priority of Japanese Patent Application No. 2006-288725 filed on Oct. 24, 2006, the disclosure of which is incorporated herein by reference.

FIELD OF THE DISCLOSURE

The present disclosure generally relates to a driving support apparatus for use in a vehicle.

BACKGROUND INFORMATION

Conventionally, a safe driving support apparatus is known for providing a control of a vehicle in order to avoid an unsafe condition of the vehicle (designated as avoidance control hereinafter) based on information about a physical environment surrounding the vehicle and a content of a driving operation by a driver of the vehicle (refer to Japanese patent document JP-A-2002-163789).

In addition, as disclosed in Japanese patent document JP-A-2002-230696, a technique for calculating a reward point for the driver of the vehicle based on an evaluation of a degree of safety of the driving operation by utilizing a driving condition history that includes vehicle speed, vehicle start/stop, acceleration/deceleration, and a yaw rate is used for popularizing the safe driving support apparatus and for encouraging a use of the apparatus.

However, according to an inventor's consideration, simply popularizing the safe driving support apparatus and improving its utilization rate does not necessarily contribute to driving safety. That is, for example, when the driver overestimates the ability of the safe driving support apparatus disposed on the vehicle, safety consideration and/or attentiveness by the driver him/herself may possibly be expelled from his/her mind.

SUMMARY OF THE DISCLOSURE

In view of the above and other problems, the present disclosure provides a technique that encourages a driver of a vehicle to exert his/her attentiveness for refraining from overestimating the ability of a safe driving support apparatus even when he/she is driving a vehicle that is equipped with the safe driving support apparatus.

The first aspect of the present disclosure is characterized as a driving operation feedback apparatus that is intended for providing a safe driving support function that provides an avoidance control for avoiding an unsafe condition of the vehicle based on information about a physical environment of the vehicle and driving operation of the vehicle changes an driving operation evaluation for the driver to a lower grade based on a provision of the avoidance control, records the evaluation after grade change and notifies the driver of the changed evaluation.

In this manner, the driving operation evaluation is lowered once the avoidance control is provided and the driver is notified of the lowered evaluation. Therefore, the driver is encouraged to maintain the driving operation evaluation and spontaneously pay attention not to cause the avoidance control. As a result, even when the vehicle is equipped with the safe driving support function, an overestimation of the safe driving support function by the driver is prevented.

In this case, a concept of "the physical environment of the vehicle" includes an existence of an object around the vehicle, the weather around the vehicle, the brightness around the vehicle, an inclination of a road where the vehicle is traveling, and the like. Further, a concept of "the object around the vehicle" includes other vehicles, a bicycle, a moving object such as a pedestrian or the like, and a still object such as a building or the like.

Furthermore, a concept of "the avoidance control" includes a unsafe warning that warns the driver about the vehicle on the verge of an unsafe condition and encourages the driver to provide a vehicle control for avoiding the unsafe condition of the vehicle. Furthermore, a concept of "the avoidance control" includes a control of vehicle behavior for avoiding the unsafe condition of the vehicle.

The second aspect of the present disclosure is characterized that the provision of the avoidance control from the driving operation feedback apparatus may be associated to a suppression of an operation of a function that mainly contributes to a comfort of the vehicle.

In this manner, when the avoidance control is provided, the comfort of the vehicle deteriorates. This gives an incentive for the driver not to cause the avoidance control by exerting attentiveness for safe driving of the vehicle, thereby leading to a prevention of overestimation of the safe driving support function equipped in the vehicle.

The third aspect of the present disclosure is characterized that the provision of the avoidance control from the driving operation feedback apparatus may be associated to a prohibition of starting a travel of the vehicle.

In this manner, when the avoidance control is provided, the travel of the vehicle is prohibited. This gives an incentive for the driver not to cause the avoidance control by exerting attentiveness for safe driving of the vehicle, thereby leading to a prevention of overestimation of the safe driving support function equipped in the vehicle.

The first to third aspects of the present disclosure can also be grasped as a program product stored in a memory medium for operating a computer as the driving operation feedback apparatus.

BRIEF DESCRIPTION OF THE DRAWINGS

Other objects, features and advantages of the present invention will become more apparent from the following detailed description made with reference to the accompanying drawings, in which.

DETAILED DESCRIPTION

Embodiments of the present disclosure are described with reference to the accompanying drawings.

First Embodiment

Figure 1:
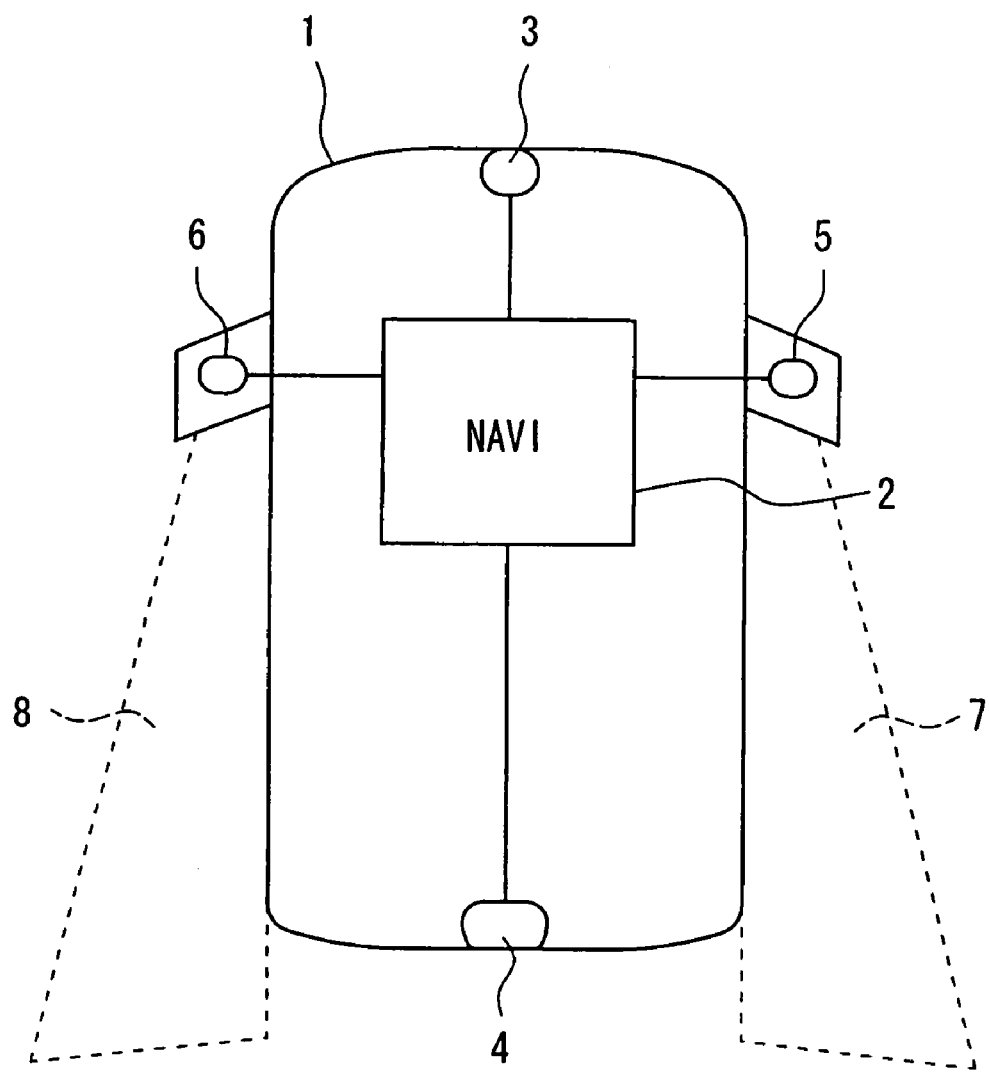
FIG. 1 shows an illustration of installation positions of a navigation apparatus, a front camera, a rear camera, a right camera and a left camera on a vehicle in an embodiment of the present disclosure.

The first embodiment of the present disclosure is explained as follows. The illustration in FIG. 1 shows positions of a navigation apparatus 2, a front camera 3, a backward camera 4, a right camera 5 and a left camera 6 on the vehicle 1 in the present embodiment schematically.

The navigation apparatus 2 is disposed at the position that a driver can see in a compartment, and receives a signal from cameras 3-6. The front camera 3 is disposed at a front end of the vehicle 1, and a front field of the vehicle 1 is photographed, and an image of a photographing result is output to the navigation apparatus 2 regularly (for example, every 30 milliseconds). The backward camera 4 is disposed at a rear end of the vehicle 1, and a rear field of the vehicle 1 is photographed, and an image of a photographing result is output to the navigation apparatus 2 regularly. The right camera 5 is disposed on a right door mirror part of the vehicle 1, and an area 7 extending from the right side region of the vehicle 1 to the vehicle right rear is photographed, and an image of a photographing result is output to the navigation apparatus 2 regularly. The left camera 6 is disposed on a left door mirror part of the vehicle 1, and an area 8 extending from the left region of vehicle 1 to the vehicle left rear is photographed, and an image of a photographing result is output to the navigation apparatus 2 regularly.

Figure 2:
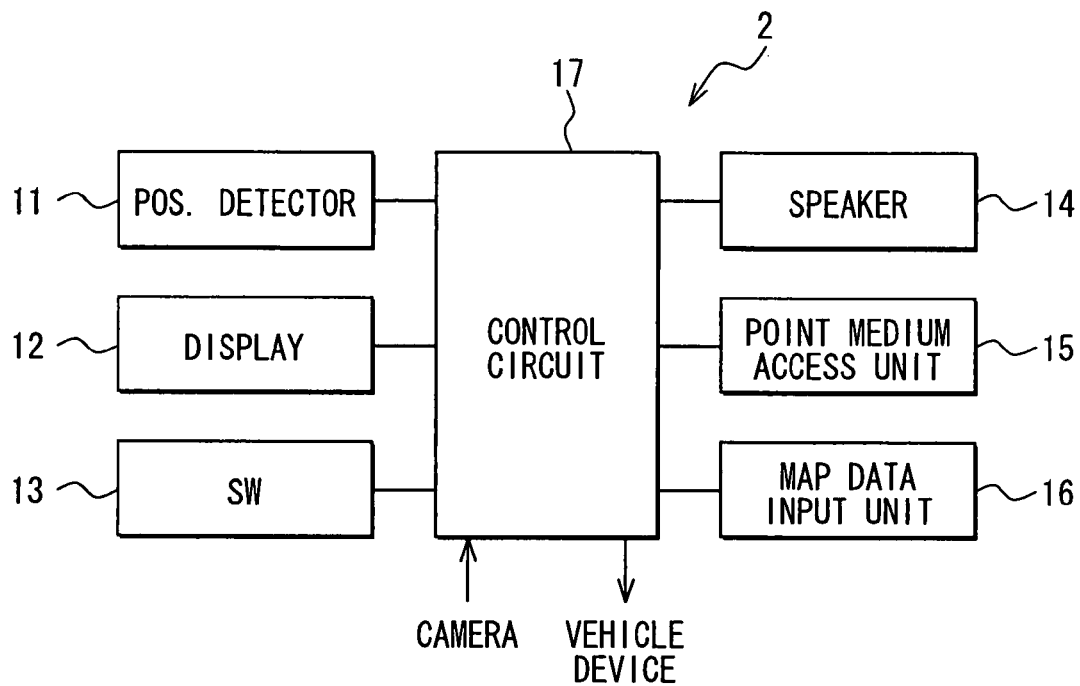
FIG. 2 shows a block diagram of the navigation system in a first and a second embodiment of the present disclosure.

A hardware constitution of the navigation apparatus 2 is shown in FIG. 2. The navigation apparatus 2 has a position detector 11, an image display unit 12, an operation switches 13, a speaker 14, a point medium access unit 15, a map data input unit 16 and a control circuit 17.

The position detector 11 has sensors such as a GPS receiver, a speed sensor, a steering angle sensor, a yaw rate sensor, a brake sensor, an acceleration sensor, a geomagnetism sensor and the like, and information to identify a vehicle's behavior such as a current position, a direction, stop count and the like is output to the control circuit 17. The operation switches 13 have a mechanical switch, a touch panel or the like that are disposed at the position that is operable by the driver.

The point medium access unit 15 is a unit that is capable of connecting to a point medium in an electric, magnetic or optical manner, and read/write an evaluation point that evaluates driving operation of the driver from/to the connected point medium. A portable storage medium (for example, an IC card, a magnetic card, a USB flash memory or the like) that can be carried by the driver may be used as a point medium.

The map data input unit 16 is a device that retrieves from (and writes to if possible) a nonvolatile storage medium such as a DVD, a CD, an HDD and the like, and stores a program that the control circuit 17 carries out, map data for route guidance.

The control circuit (i.e., a computer) 17 is a microcomputer having a central processing unit (CPU), a RAM, a ROM, a flash memory and the like. The central processing unit carries out a program for an operation of the navigation apparatus 2 which has been retrieved from the map data input unit 16, and, during the execution of the program, information is retrieved from the RAM, ROM, flash memory, point medium and map data input unit 16, and is written on the RAM, flash memory, point medium, map data input unit 16. In addition, the central processing unit exchanges a signal with the position detector 11, image display unit 12, operation switch 13 and speaker 14. In addition, the control circuit 17 is connected to other devices such as, for example, compartment air temperature regulating device, a brake control ECU, an engine ECU, a wiper control ECU, a light control ECU and the like) through, for example, vehicle local area network, and the other devices are to be controlled through the connection.

The control circuit 17 carries out a program for performing processes such as a current position identification process, a navigation route calculation process, a route guidance process, a driving operation feedback process and the like. The current position identification process is a process for identifying a current position and a direction of the vehicle based on a signal from the position detector 11. The navigation route calculation process is a process that accepts an input of a destination by a user from the operation switches 13 and calculates the most suitable navigation route from the current position to the destination. The route guidance process is a process that outputs the image of a calculated navigation route, the destination, the current position and the like to the image display unit 12 by reading map data from the map data input unit 16, and also outputs a guidance voice signal for a right/left turn instruction and the like to the speaker 14 as required at times when the vehicle approaches a guidance intersection or the like.

The driving operation feedback process is a process that provides a control for avoiding an unsafe condition of the vehicle (designated as an avoidance control hereinafter) based on information about the physical environment around the vehicle 1 and contents of the driving operation, changes the evaluation point in the point medium to a lower/higher grade, and overwrites to the point medium the evaluation point after grade change, and notifies the driver of the evaluation point after grade change.

Figure 3:
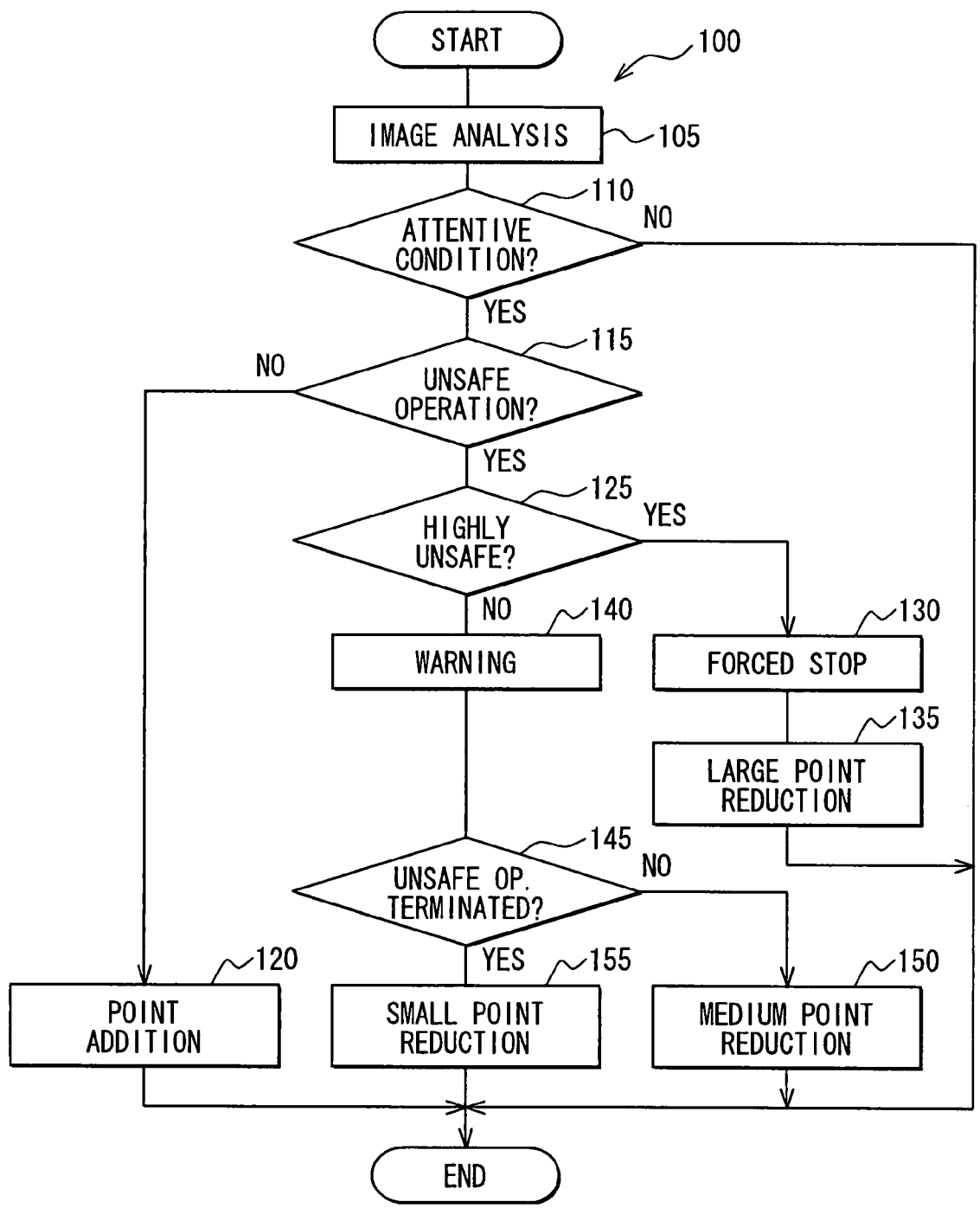
FIG. 3 shows a flowchart of a program executed in a control circuit in the first embodiment of the present disclosure.

A flowchart of a program 100 that the CPU of the control circuit 17 repeatedly carries out is shown in FIG. 3.

At first, in execution of the program 100, the control circuit 17 analyzes plural photographed images received repeatedly from the cameras 3-6 in step 105. In the image analysis, the images from each camera is analyzed for detecting an object such as a walker, a bicycle, a vehicle and the like by the well-known movement detection and pattern recognition, and, from a size and a change of the size of the object in a photographed image, a relative position and a travel speed of the object relative to the subject vehicle are identified.

Then, in step 110, based on an analysis result of step 105, whether the vehicle 1 is in the attentive condition at present is determined. The attentive condition is a situation that the vehicle 1 is in danger of having contact with a walker, a bicycle, an oncoming car, an obstacle or the like being detected depending on an operation of the driver.

Whether the vehicle 1 is in the attentive condition is identified based on the relative position and the relative travel speed of the object identified in step 105. More practically, the criterion employed determines that the vehicle 1 is in the attentive condition more easily when the object is closer to the vehicle 1 or when the object is coming closer to the vehicle 1 more rapidly. In addition, whether the vehicle is in the attentive condition is determined based on the current navigation route of the subject vehicle.

For example, when the vehicle 1 is in a predetermined distance (for example, 20 meters) from a certain crossing, and the vehicle 1 is, according to the current navigation route, going to turn left at the crossing, and the image from the left camera 6 contains a bicycle, and the bicycle is within a predetermined distance (for example, 5 meters) from the vehicle, and the bicycle is traveling in the same direction as the vehicle 1, the control circuit 17 determines that the vehicle 1 is in the attentive condition based on the determination that the vehicle 1 may possibly in contact with the bicycle during a travel after the left turn if the vehicle continues the travel after the left turn without stopping just after turning. In this case, the control circuit 17 identifies the continuation of the travel after the left turn without stopping just after turning as an unsafe operation (that is, an example of a specific operation).

In addition, when the vehicle 1 is in a predetermined distance (for example, 20 meters) from a certain intersection, and the vehicle 1 is, according to the current navigation route, going to turn right at the intersection, and the image from the front camera 3 contains an oncoming vehicle, and the oncoming vehicle is traveling at a position and a speed for entering the intersection within a predetermined time (for example, 15 seconds), the control circuit 17 determines that the vehicle 1 is in the attentive condition based on the determination that the vehicle 1 may possibly in contact with the oncoming vehicle when the vehicle 1 starts the right turn before the oncoming vehicle passes through the intersection. In this case, the control circuit 17 identifies the start of the right turn of the vehicle 1 before passing through the intersection of the oncoming vehicle as an unsafe operation.

Further, when the vehicle 1 is traveling backward, and the image from the rear camera 4 contains an obstacle such as another car, a wall or the like, and the obstacle is existing at a position within 50 centimeters from a rear end of the another car, the control circuit 17 determines that the vehicle 1 is in the attentive condition based on the determination that the vehicle 1 may be in danger of contacting the obstacle when the vehicle 1 travels backward at a speed exceeding a predetermined value (for example, 2 kilometers per hour). In this case, the control circuit 17 identifies backward traveling of the vehicle 1 at the speed that is higher than the predetermined speed as an unsafe operation. In addition, whether the vehicle 1 is traveling backward may be determined based on a signal from a shift position sensor or a drive position sensor.

When the vehicle 1 is determined to be in the attentive condition, step 115 is carried out successively, and when it is determined that the vehicle 1 is not in the attentive condition, one cycle of execution of the program 100 concludes itself.

In step 115, whether the specific unsafe operation has been started is determined based on a signal from the position detector 11, a photographed image from the cameras 3-6. For example, in the example of the left turn described above, it is determined that the unsafe operation has been started when stepping on a brake pedal within a predetermined period (e.g., 0.5 seconds) after the left turn of the vehicle 1 is not detected. In addition, in the same example, it is determined the unsafe operation has not been started when stepping on a brake pedal within a predetermined period (e.g., 0.5 seconds) after the left turn of the vehicle 1 is changed a direction into the left in the same example. When the unsafe operation has been started, step 125 is carried out successively, and when the unsafe operation has not been started, step 120 is carried out successively.

In step 120, a point addition process is performed. More practically, a current evaluation point is read from the point medium that is being connected to the point medium access unit 15, and the total of the current point and the addition point P is overwritten to the point medium as a new evaluation point. Then in step 120, the new evaluation point is displayed as a letter on the image display unit 12, or is output from the speaker 14 as a sound. After step 120, one cycle of execution of the program 100 concludes itself.

Whether the unsafe operation being started in step 115 is a highly unsafe operation is determined in step 125. The determination is performed based on a photographed image from the cameras 3-6 and the current speed of the vehicle 1. More practically, it is determined to be highly unsafe when the vehicle 1 maintaining the current speed is going to contact with the walker, the bicycle, the oncoming vehicle, or the obstacle securely. When the present determination result is affirmative, step 130 is carried out successively, and when the determination result is negative, step 140 is carried out successively.

In step 130 after having determined that it is highly unsafe, a travel of the vehicle 1 is stopped forcibly by controlling the brake ECU of the vehicle 1. Then, in step 135, point subtraction process is performed successively. More practically, a current evaluation point is read from the point medium that is being connected to the point medium access unit 15, and the point after subtracting the subtraction point A from the current point is overwritten to the point medium as a new evaluation point. Then in step 135, the new evaluation point is displayed as a letter on the image display unit 12, or is output from the speaker 14 as a sound. After step 135, one cycle of execution of the program 100 concludes itself.

Figure 4:
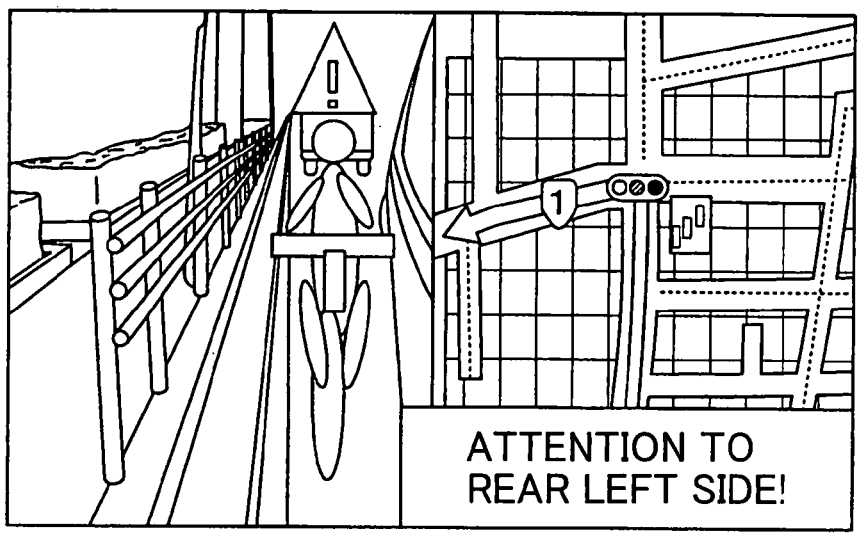
FIG. 4 shows an illustration of a warning screen on a display unit for a warning.

In step 140 after having determined that it is not highly unsafe, warning is provided. For example, in an example of the left turn described above, the image display unit 12 displays a screen as shown in FIG. 4. The right half of the screen shows a message "Attention to rear left side!" In addition, the left half of the screen displays a photographed image of the bicycle output from the left camera 6 and an emphasis mark at a proximity of the photographed image. In addition, from the speaker 14, a voice message "Be careful to the rear left side" may be output.

Then, in step 145, whether the unsafe operation has been terminated is determined. For example, in the example of the left turn described above, the unsafe operation is determined to have been terminated when the driver has stopped the vehicle just after the warning. When the unsafe operation has not been terminated, step 150 is carried out successively, and when the unsafe operation has been terminated, step 155 is carried out successively.

In step 150, the point subtraction process is performed. More practically, a current evaluation point is read from the point medium that is being connected to the point medium access unit 15, and the point after subtracting the subtraction point B from the current point is overwritten to the point medium as a new evaluation point. In this case, the point B is the value that is smaller than the point A. Then, in step 150, the new evaluation point is displayed as a letter on the image display unit 12, or is output from the speaker 14 as a sound. After step 150, one cycle of execution of the program 100 concludes itself.

In step 155, the point subtraction process is performed. More practically, a current evaluation point is read from the point medium that is being connected to the point medium access unit 15, and the point after subtracting the subtraction point C from the current point is overwritten to the point medium as a new evaluation point. The point C is the value that is smaller than the point B in this case. Then, in step 155, the new evaluation point is displayed as a letter on the image display unit 12, or is output from the speaker 14 as a sound. After step 155, one cycle of execution of the program 100 concludes itself.

The navigation apparatus 2 determines whether it is in the unsafe situation based on the photographed image from the cameras 3-6 (refer to step 105) by letting the control circuit 17 carry out the program 100 (refer to step 110), and then determines whether an unsafe driving operation has been started successively if it is in the attentive condition (refer to step 115), and changes the evaluation point to a higher value for the driver concerned if there is not an unsafe driving operation before the unsafe situation terminates (refer to step 120).

In addition, if the unsafe operation is started before the attentive condition terminates, whether a degree of unsafety of the unsafe operation is highly unsafe (refer to step 125), and the vehicle 1 is forcibly stopped for preventing a contact of the vehicle 1 with another object if the operation is highly unsafe (refer to step 130), and the evaluation point for the current driver is reduced by the point A that is highest among the subtraction point before recoding/displaying.

In addition, if the operation started is not highly unsafe, the warning display is provided for the driver (refer to step 140), and whether the driver has terminated the unsafe operation before the attentive condition terminates thereafter (refer to step 145). And, if the operation has not been terminated, the second highest point B among the subtraction point is reduced from the evaluation point (refer to step 150), or if the operation has been terminated, the lowest point C among the subtraction points is reduced from the evaluation point for the current driver before recording/displaying (refer to step 155).

In this manner, the evaluation for the driving operation of the driver is lowered when the avoidance control is provided by the safe driving support function, and the driver is notified of the lowered evaluation grade. Therefore, the driver becomes conscious not to deteriorate the evaluation, and will mind a safe travel of the vehicle so that the avoidance control will not be provided. As a result, in the vehicle that is equipped with the safe driving support function, the driver does not depend too much on the safe driving support function.

In addition, the navigation apparatus 2 changes, based on stopping of the specific operation by the driver due to the unsafe warning being provided, the evaluation lowered by the point C, or changes, based on not stopping the specific operation by the driver in spite of the unsafe warning, the evaluation lowered by the point B which is bigger than the point C.

In this manner, the evaluation of the driver who ignores the unsafe warning from the safe driving support function is lowered further among other drivers. Therefore, even when the driver is paying attention not to have the avoidance control being provided, the driver considers the unsafe warning as important upon receiving the unsafe warning due to the avoidance control.

In addition, by having a configuration that the navigation apparatus 2 changes the evaluation to the lower grade for the avoidance control relative to the unsafe warning, the driver's reliance on the safe driving support function is accurately reflected on the evaluation. Therefore, the driver considers the evaluation as more important.

Further, the vehicle 1 raises the evaluation of the driver when he unsafe operation is not conducted as a result of not relying on the safe driving support function. Therefore, the driver's manner that does not rely on the safe driving support function is reflected to a high evaluation, thereby leading to higher appreciation of the evaluation by the driver.

Furthermore, the navigation apparatus 2 uses the point medium which can be carried by a driver as a storage medium to record the evaluation after evaluation grade change. In this manner, even for the driver who uses plural vehicles, an evaluation of the driver for the driving operation of plural vehicles can totally be calculated when each of the plural vehicles is equipped with the navigation apparatus 2 that is described in the present embodiment.

Second Embodiment

Figure 5:
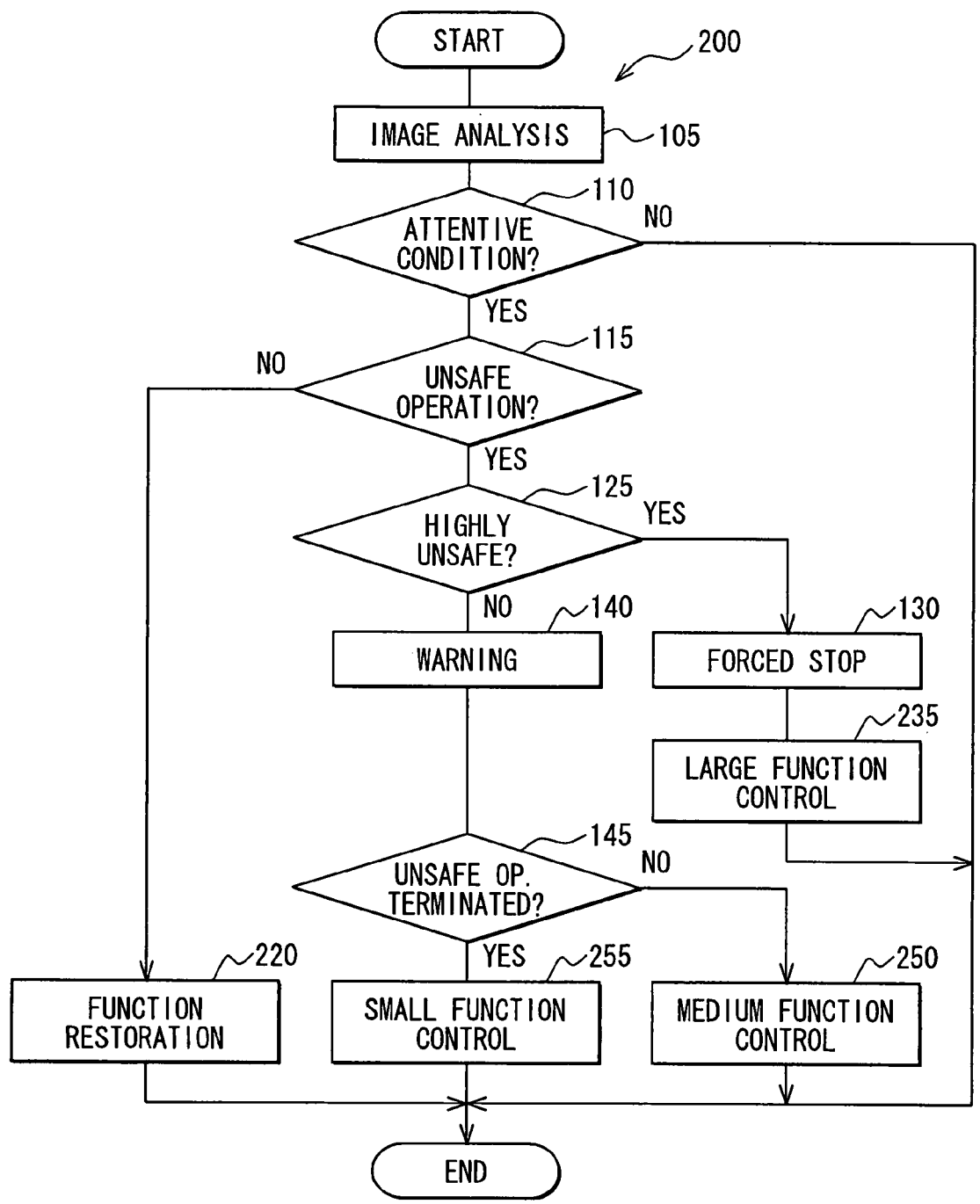
FIG. 5 shows a flowchart of a program executed in the control circuit in the second embodiment of the present disclosure.

The second embodiment of the present disclosure is explained as follows. The difference of the present embodiment from the first embodiment exist in that the control circuit 17 executes the program 200 in FIG. 5 instead of the program 100 in FIG. 3. In addition, steps having the same process have same step numbers in the flowcharts in FIG. 3 and FIG. 5, and explanation about the details of those steps is omitted in this case.

When it is determined that the unsafe operation has been terminated in step 145 during an execution of the program 200, the control circuit 17 of the present embodiment carries out the function suppression process in step 255 successively. The function suppression process is a process for suppressing a function of devices in the vehicle, that is, a suppression of the operation of a function mainly contributing to a comfort of the vehicle when functions of the devices are categorized to be contributing to a comfort or safety. As functions mainly contributing to a comfort of the vehicle, an air temperature regulation function of an air temperature regulating device in a vehicle compartment, a route guidance process of the navigation apparatus 2 itself, a map display process and the like may be included. The driver suffers from deteriorated comfort such as being prohibited from accessing the air temperature regulation function, being suppressed to have the air temperature setting over 28 degrees or under 15 degrees, or the like. In addition, in step 255, the content of a suppressed function is recorded in the point medium. Further, in this case, the process identical to the one in step 155 of the first embodiment may be performed at the same time. After step 255, one cycle of execution of the program 200 concludes itself.

In addition, the function suppression process is carried out in step 250 successively when it is determined that the unsafe operation has not been terminated in step 145. The function to be suppressed in step 250 is a function that is not identical to the function to be suppressed in step 255, and is a function that contributes to the comfort by a greater degree than the function to be suppressed in step 255.

For example, a function to be suppressed in step 250 may be a combination of a function to be suppressed in step 255 and a function that contributes to another kind of comfort. Also, in step 250, a degree of suppression of the function to be suppressed in step 255 may be raised. That is, for example, the compartment temperature may be allowed to be set over 28 degrees or under 15 degrees in step 255, and the compartment temperature may be allowed to be set over 30 degrees or under 13 degrees in step 250. Furthermore, in step 250, the content of a suppressed function is recorded in the point medium. Furthermore, in this case, the process identical to the one in step 150 of the first embodiment may be performed at the same time. After step 250, one cycle of execution of the program 200 concludes itself.

In addition, the function suppression process is carried out in step 235 successively after having stopped the vehicle forcibly in step 130. The function to be suppressed in step 250 is a function is not identical to the one suppressed in step 255 or 250, and is a function that contributes to the comfort by a greater degree than the function to be suppressed in step 255 or 250. In addition, in step 235, the content of a suppressed function is recorded in the point medium. Further, in this case, the process identical to the one in step 135 of the first embodiment may be performed at the same time. After step 235, one cycle of execution of the program 200 concludes itself.

In addition, a function restoration process is carried out in step 220 successively when it is determined that the unsafe operation has not been started in step 115. In other words, a suppression of a function suppressed in step 235, 250, 255 in the past is removed, and the function that is subject to suppression removal is erased from the point medium. In this case, the removal of the suppression may be performed as a complete removal of the suppression from all of the currently suppressed functions, or as a complete removal of the suppression from a portion of the currently suppressed functions. The removal of the suppression may also be a predetermined degree of suppression removal from all of the currently suppressed functions. When no function suppression is performed at a time of execution of step 220, the suppression removal is not performed. Further, in this case, the process identical to the one in step 120 of the first embodiment may be performed at the same time. After step 220, one cycle of execution of the program 200 concludes itself.

The navigation apparatus 2 determines whether the attentive condition exists (refer to step 110) based on a photographed image from the cameras 3-6 by letting the control circuit 17 carry out the program 200, determines whether an unsafe driving operation has been started successively if the attentive condition exists (refer to step 115), and removes all or a part of the suppression of functions, if the suppression does exist, in a case that the unsafe driving operation has not been observed before the attentive condition is terminated (refer to step 220).

If the unsafe operation is started before the attentive condition is terminated, whether the degree of unsafety of the unsafe operation is highly unsafe is determined (refer to step 125), and the vehicle 1 is brought to a forced stop for preventing a contact of the vehicle 1 with other objects (refer to step 130), and the strongest function suppression is carried out among function suppressions of a comfort of the vehicle (refer to step 235).

In addition, when the degree of unsafety of the unsafe operation is not highly unsafe, a warning display is performed for the driver (refer to step 140), and whether the driver has terminated the unsafe operation before the attentive condition disappears thereafter is determined (refer to step 145). Then, if the unsafe operation has not been terminated, secondly strong function suppression is carried out among function suppressions of a comfort of the vehicle (refer to step 250). If the usafe operation has been terminated, the weakest function suppression is carried out among function suppressions of a comfort (refer to step 255).

In this manner, a comfort of the vehicle deteriorates when the avoidance control is provided by the safe driving support function. Therefore, the driver who does not want to deteriorate a comfort of the vehicle will mind a safe travel of the vehicle so that the avoidance control is not provided. As a result, even in the vehicle which is equipped with the safe driving support function, the driver does not overly depend on the safe driving support function.

In addition, the navigation apparatus 2 suppresses a first function among plural functions that mainly contribute to a comfort of the vehicle based on stopping of the unsafe operation by the driver upon receiving the unsafe warning, or suppresses a second function among the plural functions based on not stopping of the unsafe operation by the driver in spite of receiving the unsafe warning. In this case, a negative influence for a comfort in the compartment is configured to be greater by suppression of the second function than suppression of the first function.

In this manner, that is, when the suppressed function is differentiated between the driver who minds the unsafe warning from the safe driving support function and the driver who ignores the unsafe warning, the driver considers the unsafe warning due to a provision of the avoidance control as important even when not having the avoidance control from the safe driving support function is a subject of consideration by the driver.

Further, the navigation apparatus 2 suppresses a third function among plural functions that mainly contribute to a comfort of the vehicle based receiving the unsafe warning, or suppresses a fourth function among the plural functions based on performing a control of vehicle behavior. In this case, a negative influence for a comfort in the compartment is configured to be greater by suppression of the fourth function than suppression of the third function.

In this manner, that is, by differentiating the suppressed function between a case of vehicle behavior control and a case of unsafe warning, the driver considers the unsafe warning due to a provision of the avoidance control as important even when not having the avoidance control from the safe driving support function is a subject of consideration by the driver.

In addition, the navigation apparatus 2 removes the suppression of the functions currently provided based on not performing by the driver a specific operation that is determined by the safe driving support function.

In this manner, the suppressed function is restored when the specific operation is not performed by the driver as a result of not relying on the safe driving support function. Therefore, reliance on the safe driving support function of a driver is accurately reflected to the function suppression, thereby leading to higher appreciation of the function suppression by the driver.

Furthermore, the navigation apparatus 2 uses the point medium which can be carried by a driver as a storage medium to record the evaluation after evaluation grade change. In this manner, even for the driver who uses plural vehicles, an evaluation of the driver for the driving operation of plural vehicles can totally be calculated when each of the plural vehicles is equipped with the navigation apparatus 2 that is described in the present embodiment.

Third Embodiment

Figure 6:
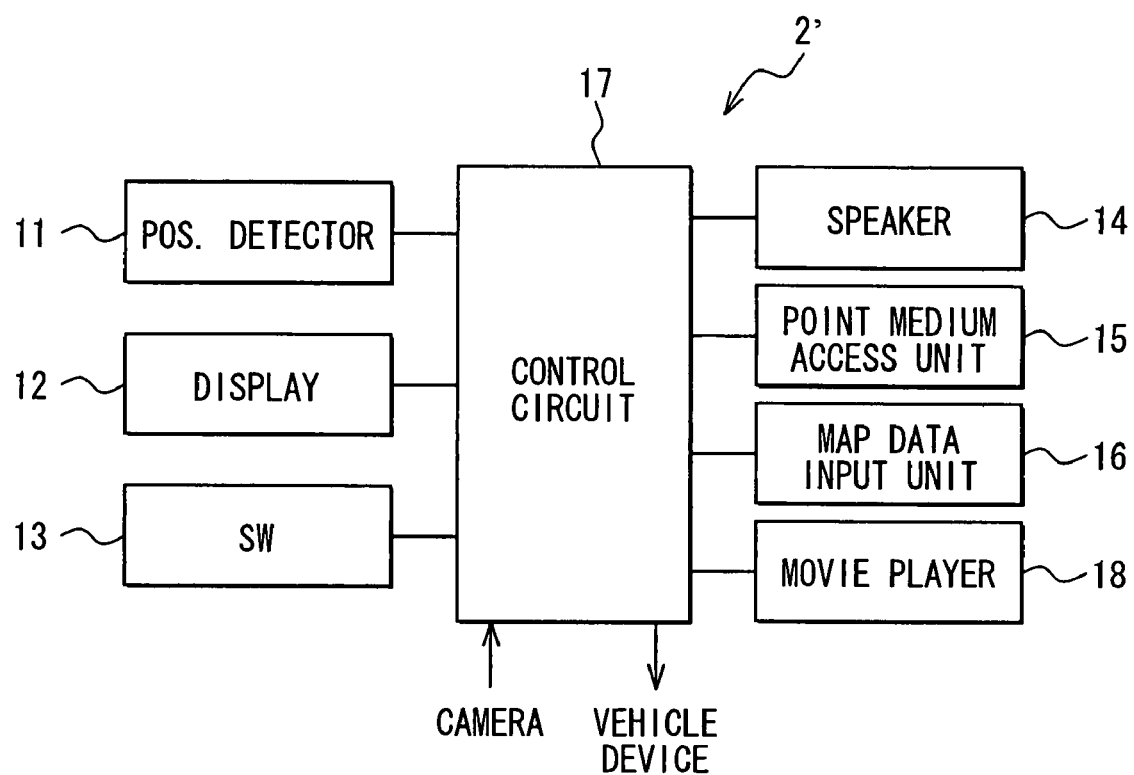
FIG. 6 shows a block diagram of a navigation system in a third embodiment of the present disclosure.

The third embodiment of the present disclosure is explained in the following. The first difference of the present embodiment from the second embodiment is that the navigation apparatus 2' has a movie player 18 as shown in FIG. 6 in addition to the configuration of the navigation apparatus 2 in the second embodiment.

The movie player 18 plays a movie by retrieving it from a storage medium such as hard disks or the like installed therein for memorizing movie data. The movie player 18 controls the image display unit 12 for displaying the movie. The movie player 18 starts the operation when a predetermined operation is performed on the operation switches 13. The movie recorded in the movie player 18 is intended for the purpose of safe driver education.

The second difference of the present disclosure from the second embodiment is that the function suppression in the present embodiment is a prohibition of a start function of a travel of the vehicle (for example, a prohibition of a start of an engine) instead of suppression of comfort functions in the second embodiment.

In this manner, starting a travel of a vehicle is prohibited when the avoidance control is provided by the safe driving support function. Therefore, the driver who does not want to a prohibition of a travel of a vehicle minds a safe travel of the vehicle so that avoidance control will not be provided. Thus, even in the vehicle which is equipped with the safe driving support function, the driver does not depend too much on the safe driving support function.

The third difference of the present embodiment from the second embodiment is that the restoration of the suppressed function (i.e., the removal of the suppression) is performed based on the completion of the playback of the movie for the purpose of the safe driving education instructed by the driver with the operation on the operation switches 13 in the present embodiment. This makes a contrast to the restoration of the suppressed function based on not starting the unsafe operation in the second embodiment. In this manner, consciousness to careful driving of the driver is raised because removal of travel start prohibition of a vehicle is performed for the driver who watched the movie for safe driving education.

Although the present invention has been fully described in connection with the preferred embodiment thereof with reference to the accompanying drawings, it is to be noted that various changes and modifications will become apparent to those skilled in the art.

For example, the safe driving support function may not provide the avoidance control based on information on the walker, the bicycle, the vehicle, or the wall around the vehicle 1.

That is, for example, the safe driving support function may determine that the vehicle 1 traveling with its headlamp not being turned on is the unsafe operation when the brightness of vehicle surroundings is lower than a predetermined standard based on a detection of ambient brightness of the vehicle 1 by, for example, using a brightness sensor. In this case, the safe driving support function may provide the unsafe warning after a predetermined period of time if the driver does not turn on the headlamp.

Also, when a rain is detected by, for example, using an output from a raindrop sensor, the safe driving support function may determine that a travel of the vehicle in the rain without operating a wiper is the unsafe operation, and the unsafe warning may be provided unless the wiper operation is turned on within a predetermined period of time.

Also, when the vehicle 1 is detected to be traveling on a slope based on a detection of inclination by, for example, using an acceleration sensor, GPS receiver and the like, accelerating the vehicle 1 to a speed over a predetermined value on a downward slope may be determined as the unsafe operation, and may be determined as a subject of the provision of the unsafe warning.

In addition, the evaluation point may be recorded in a hard disk of the map data input unit 16. The evaluation point may also be recorded in the flash memory of the control circuit 17. In that case, plural kinds of the evaluation points may be recorded, and each of the evaluation points may be associated with a user ID number.

Further, the content of a suppressed function may be recorded in the hard disk of the map data input unit 16 in the same manner, or may be recorded in the flash memory of the control circuit 17. In that case, plural kinds of the contents of suppressed function may be recorded, and each of the contents of the suppressed function may be associated with the user ID number.

In this manner, when one vehicle is driven by plural drivers, each of the plural driver can be identified for evaluation and function suppression.

In this case, the navigation apparatus 2 has to authenticate the driver for identifying who is driving the vehicle 1.

The authentication of the driver may be performed by using a password uniquely assigned to each of the drivers inputted from the operation switches 13, and by matching the inputted password with the recorded one.

The authentication may also be performed by using a finger print reader installed in the navigation apparatus 2. In this case, the finger print of each of the plural drivers is recorded by the finger print reader for the record in association with the driver's ID, and the record is used as a reference when the finger print is scanned by the finger print reader later at a time of authentication.

Further, the navigation apparatus 2 may use a sound wave radar, a laser radar to detect a relative position and a travel speed of an object around the vehicle 1.

Furthermore, in the second embodiment, a function to be suppressed in step 255 may be a different function to be suppressed in steps 255, 235, and may be a function that contributes to a comfort by a greater degree relative to the function suppressed in steps 255, 235.

In addition, subtraction points A, B, C may have a magnitude relationship of A>B>C as described in the first embodiment or otherwise such as B>A>C.

In addition, the navigation apparatus 2 may change the evaluation change value (i.e., subtractive change) due to the avoidance control according to the type of the specific operation that caused the avoidance control. In this manner, the evaluation may be calculated in a greater detail by weighting the unsafe operation types and types of the causes of the unsafe situation.

In addition, the navigation apparatus 2 may change the subject of the function suppression based on an image from which of the cameras 3-6 contains an object in danger of contact. Furthermore, the navigation apparatus 2 may change the subject of the function suppression due to the avoidance control based on the type of the specific operation that has caused the avoidance control. In this manner, the evaluation may be calculated in a greater detail and the function suppression may be further fine-tuned by weighting the unsafe operation types and types of the causes of the unsafe situation in association to the variation of the function suppression.

Furthermore, the driving operation feedback apparatus may be realized as a device that is different from the navigation apparatus 2. The feedback apparatus may be any device that provides the avoidance control based on information on the physical environment around the vehicle and the content of the driving operation by the driver, and the device may calculate an evaluation point according to the avoidance control or may provide function suppression of an equipment in the vehicle.

Furthermore, each of the functions provided by an execution of the program by the control circuit 17 in the above embodiments may be provided by hardware (an FPGA which, for example, can program a circuit structure) having those functions.

Such changes and modifications are to be understood as being within the scope of the present invention as defined by the appended claims.

What is claimed is:

1. A driving operation feedback apparatus comprising:
   a safe driving support unit that performs an avoidance control to have a vehicle avoid an unsafe condition based on information regarding physical condition around the vehicle and on a content of a driver's operation of the vehicle;
   a function suppression unit that prohibits traveling of the vehicle based on the avoidance control performed by the safe driving support unit, and
   a movie player that plays a movie for a safe driving operation lesson based on the driver's operation, wherein the function suppression unit releases a prohibition of the traveling of the vehicle based on a playback of the movie by the movie player.

2. A program product stored in a storage medium for operating a computer as following units, the program product comprising steps of:

providing a safe driving support unit that performs an avoidance control to have a vehicle avoid an unsafe condition based on information regarding physical condition around the vehicle and on a content of a driving operation by a driver in the vehicle, providing a function suppression unit that prohibits traveling of the vehicle based on the avoidance control performed by the safe driving support unit, and providing a movie player that plays a movie for a safe driving operation lesson based on the driver's operation, wherein the function suppression unit releases a prohibition of the traveling of the vehicle based on a playback of the movie by the movie player.

* * * * *